US008976122B2

(12) United States Patent
Chang et al.

(10) Patent No.: US 8,976,122 B2
(45) Date of Patent: Mar. 10, 2015

(54) CONTROL UNIT, SENSING DEVICE FOR A CAPACITIVE TOUCH PANEL AND METHOD THEREFOR

(75) Inventors: Chin-Fu Chang, Sinjhuang (TW); Cheng-Han Lee, Sijhih (TW)

(73) Assignee: Egalax_Empia Technology Inc., Taipei (TW)

( * ) Notice: Subject to any disclaimer, the term of this patent is extended or adjusted under 35 U.S.C. 154(b) by 1177 days.

(21) Appl. No.: 12/457,867

(22) Filed: Jun. 24, 2009

(65) Prior Publication Data

US 2010/0327881 A1 Dec. 30, 2010

(51) Int. Cl.
*G06F 3/041* (2006.01)
*G06F 3/045* (2006.01)
*G06F 3/044* (2006.01)

(52) U.S. Cl.
CPC ...................................... *G06F 3/044* (2013.01)
USPC .......................................... 345/173; 345/174

(58) Field of Classification Search
CPC ................................ G09G 3/041; G09G 3/044
USPC ................ 345/173, 174; 324/658; 178/18.03, 178/18.06
See application file for complete search history.

(56) References Cited

U.S. PATENT DOCUMENTS

| 5,940,065 | A | * | 8/1999 | Babb et al. ..................... 345/178 |
| 2005/0041018 | A1 | * | 2/2005 | Philipp ......................... 345/178 |
| 2007/0291011 | A1 | * | 12/2007 | Chang ........................... 345/173 |
| 2007/0291012 | A1 | | 12/2007 | Chang | |

FOREIGN PATENT DOCUMENTS

TW 200802058 A 1/2008

OTHER PUBLICATIONS

Communication From the Taiwan Patent Office in a Counterpart Foreign Application Dated Jan. 16, 2012.

* cited by examiner

*Primary Examiner* — Jonathan Horner
(74) *Attorney, Agent, or Firm* — WPAT, PC; Justin King

(57) ABSTRACT

A noise reducing device for a capacitive touch panel and a method of reducing noise for a capacitive touch panel are disclosed to solve problems related to noise generated by a conventional filter circuit and an integrating circuit or external noise. In the invention, at least one switch circuit is used so that the conventional filter circuit and integrating circuit used in the prior are omitted. Signals output from a current measurement circuit are transmitting to a control unit to calculate the location of a touch point, reducing any noise.

4 Claims, 10 Drawing Sheets

CONTROL UNIT, SENSING DEVICE FOR A CAPACITIVE TOUCH PANEL AND METHOD THEREFOR

BACKGROUND OF THE INVENTION

1. Field of the Invention

The invention generally relates to a control unit, sensing device and a method, and particularly to a control unit, sensing device for a capacitive touch panel and a method therefor.

2. Description of Related Art

For a long time, the main means of input for electronic devices have been keyboard and mouse. Touch panels which receive the input information by using user's hands or touch pens to touch sensing areas on their panels have drawn attention and have been put into practice already. There are sensing devices underneath the touch panels corresponding to the sensing areas. Touch panels are categorized by the ways touch input is recognized, including resistive touch panels, capacitive touch panels, sound-wave touch panels, optical touch panels, and electromagnetic touch panels In capacitive touch panels having capacitive point-to-touch sensing means for example, all currents passing through a particular touch input location are sensed to determine the location of the touch point by means of their correlation.

FIG. 1 is a perspective view of a conventional capacitive touch panel. As shown in FIG. 1, a capacitive touch panel 10 consists of a transparent substrate 11, an electric conductive film 12, an electrode pattern 13 and an insulating hard layer 14. The transparent substrate 11 can be made of glass, for example. The electrode pattern 13 is formed along the periphery of the touch panel 10 for compensating curve distribution of an electric field for the conductive film 12 at work.

FIG. 2 is a schematic view of a location determining circuit for a conventional capacitive touch panel.

Four corners of the touch panel 10 are respectively connected to external wires A, B, C and D, and respectively receive alternative sensing signals AC1, AC2, AC3 and A4 to provide location data for a touch point P on the touch panel 10.

In operation, the alternative sensing signals AC1, AC2, AC3 and AC4 are alternative square waves or sinusoidal wave voltage signals. Currents I1, I2, I3 and I4 respectively pass through the corresponding external wires A, B, C and D. The coordinates of the touch point P can be calculated based on the following formula by respectively measuring the current changes $\Delta I1$, $\Delta I2$, $\Delta I3$ and $\Delta I4$ for the corresponding external wire A, B, C and D before and after the touch point appears:

$$x=(\Delta I3+\Delta I4-\Delta I1-\Delta I2)/(\Delta I1+\Delta I2+\Delta I3+\Delta I4) \qquad (1)$$

$$y=(\Delta I1+\Delta I4-\Delta I3-\Delta I2)/(\Delta I1+\Delta I2+\Delta I3+\Delta I4) \qquad (2).$$

The current change $\Delta I1$, $\Delta I2$, $\Delta I3$ and $\Delta I4$ can be obtained in the manner as shown in FIG. 2. The current change $\Delta I1$ is obtained by measuring the current I1 by using a current measuring circuit 15, transmitting the current I1 to a filter circuit 16, reducing noise, integrating the noise-reduced current I1 by using an integrating circuit 17, transmitting the integrated current I1 to a controller 18, converting the analogue current signal into a digital signal by using an analogue/digital conversion circuit 180 in the controller 18, and calculating the current change by using a location determining unit 182 in the controller 18. Similarly, $\Delta I2$, $\Delta I3$ and $\Delta I4$ can be obtained in turns. The current change $\Delta I1$, $\Delta I2$, $\Delta I3$ and $\Delta I4$ are processed in turns with the same analogue/digital conversion circuit 180 and calculated based on the above formula to obtain the X and Y coordinates of the touch point.

However, there can be a time difference between the calculated coordinate and the real coordinate of the touch point. Additionally, noise generated by the filter circuit 16 and the integrating circuit 17 or external noise can cause errors in the determined coordinates. Furthermore, the configuration as shown in FIG. 2 increases production costs. For example, it requires a large amount of current measurement circuits 15, filter circuits 16 and integrating circuits.

SUMMARY OF THE INVENTION

In order to solve the prior problem, it is an object of the invention to provide a sensing device for a capacitive touch panel and a method of reducing noise for a capacitive touch panel. In the invention, at least one switch circuit is placed on the X and Y axes of the touch panel, thereby reducing the use of the same circuits at backside. Current signals measured by the switch circuit are calculated by a control unit to obtain corresponding coordinate, thereby overcoming problems of time difference and external noise.

In order to achieve the above and other objectives, in a sensing device for capacitive touch panel according to the invention, the capacitive touch panel is rectangular and has a transparent substrate and a sensing layer on the transparent substrate, the sensing layer being transparent and electrically conductive. The capacitive touch panel further has a first X side, a second X side, a first Y side and a second Y side. The sensing device includes at least one X side switch circuit, at least one Y side switch circuit, a sensing source and a control circuit.

The X side switch circuit is respectively electronically connected to the first X side and the second X side. The Y side switch circuit is respectively electrically connected to the first Y side and the second Y side. The sensing source includes a first sensing signal source and a second sensing signal source. The control circuit receives at least one first sensing signal generated by the first sensing signal source and at least one second sensing signal generated by the second sensing signal source. The X side switch circuits or the Y side switch circuits is connected according to the received first sensing signals or the second sensing signals, after the X side current signal generated by the X side switch circuits or Y side current signal generated by the Y side switch circuits are received, some calculations are carried out to determine the X and the Y coordinates of a touch point.

In another embodiment, a sensing device for a capacitive touch panel is the same as above except that a first sample and hold circuit and second sample and hold circuit are added. The first sample and hold circuit is arranged between the first current measurement circuit and the first analogue/digital conversion circuit to receive the first X side current signal or the first Y side current signal for signal sampling, thereby reducing any noise generated by the first X side switch circuit or the first Y side switch circuit. The second sample and hold circuit is arranged between the second current measurement circuit and the second analogue/digital conversion circuit to receive the second X side current signal or the second Y side current signal for signal sampling, thereby reducing any noise generated the second X side switch or the second Y side switch circuit.

In still another embodiment of the invention, the sensing device for a capacitive touch panel is the same as above, except that the control unit uses only one analogue/digital conversion circuit, and an electronic switch is added to reduce any noise generated by the circuits or externally.

In order to achieve the above objectives, the method of reducing noise for a capacitive touch panel includes providing a first sensing signal source and a second sensing signal source; respectively transmitting the first sensing signal and the second sensing signal to the first X side, the first Y side, the second X side and the second Y side; obtaining a first X side analogue signal, a first Y side analogue signal, a second X side analogue signal and a second Y side analogue signal; respectively converting the first X side analogue signal, the first Y side analogue signal, the second X side analogue signal and the second Y side analogue signal into a first side digital signal, a first Y side analogue signal, a second X side digital signal and a second Y side digital signal; and transmitting the first X side digital signal, the first Y side digital, the second X side digital signal and the second Y side digital signal to a location determining unit for calculating the X and Y coordinates of a touch point.

To provide a further understanding of the invention, the following detailed description illustrates embodiments and examples of the invention, this detailed description being provided only for illustration of the invention.

DETAILED DESCRIPTION OF PREFERRED EMBODIMENTS

Figure 1:
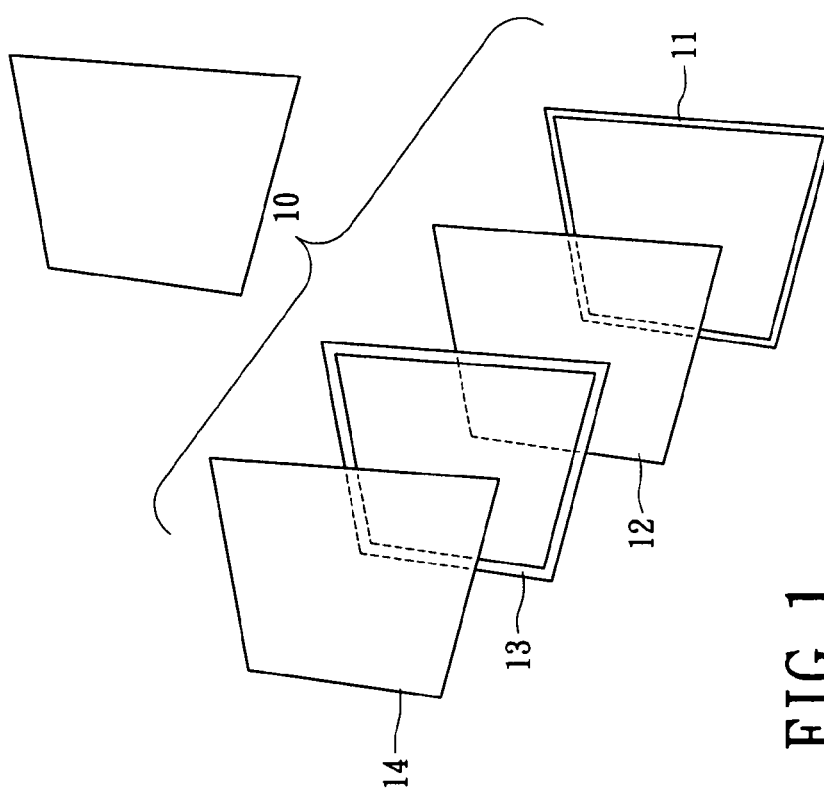
FIG. 1 is a perspective view of a conventional capacitive touch panel.
Figure 2:
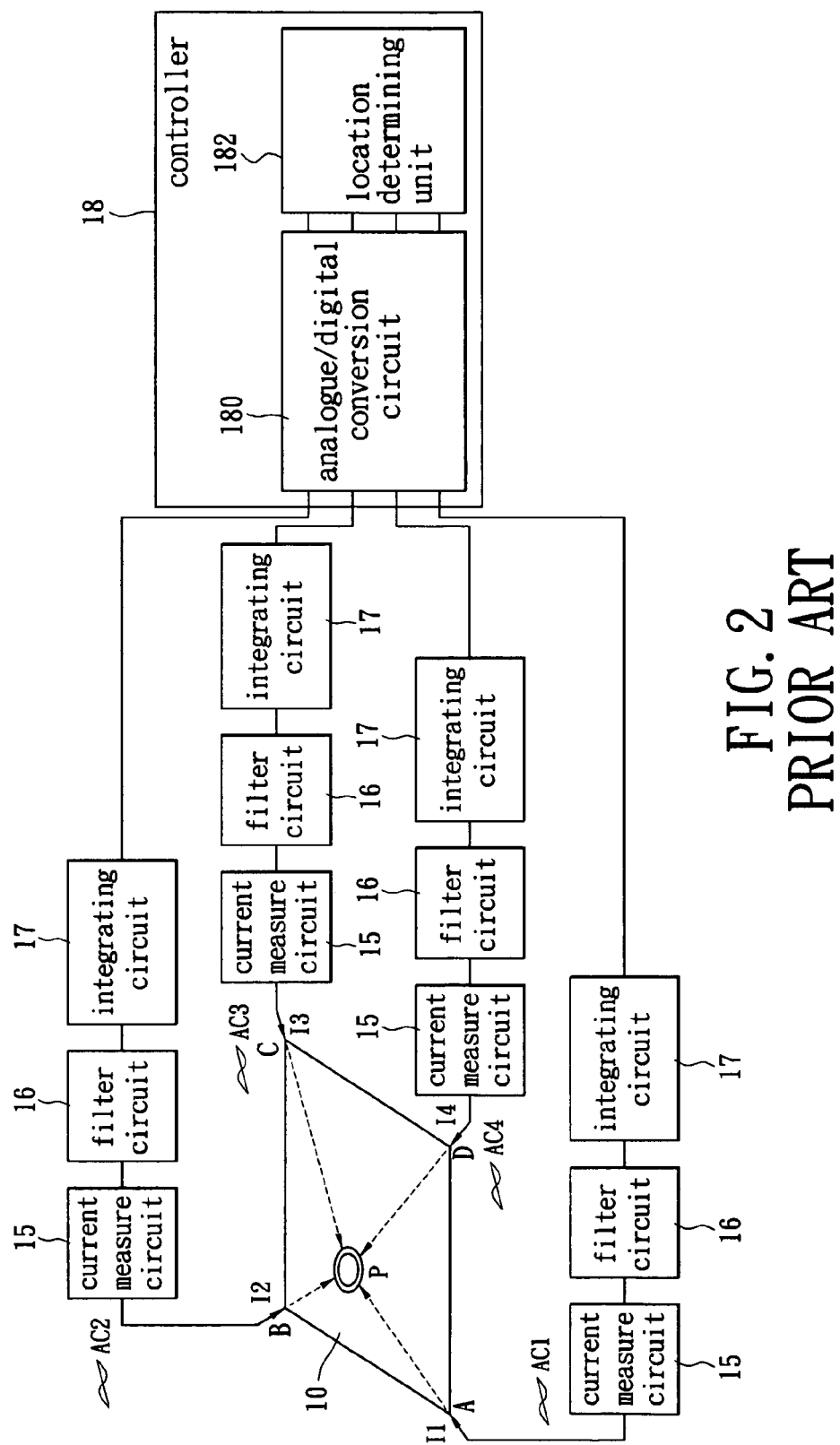
FIG. 2 is a schematic view of a location determining device for a conventional capacitive touch panel.

Wherever possible in the following description, like reference numerals will refer to like elements and parts unless otherwise illustrated.

Figure 3:
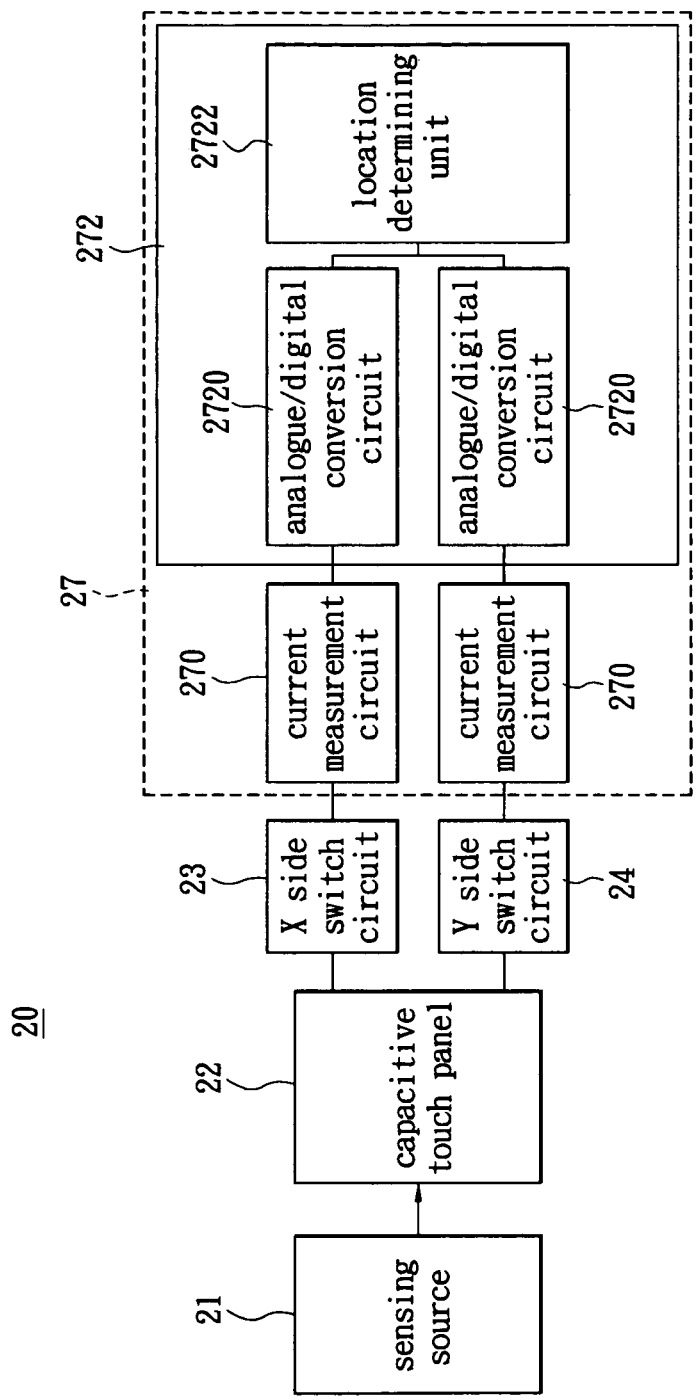
FIG. 3 is a schematic view of a sensing device for a capacitive touch panel according to one embodiment of the invention.

FIG. 3 is a schematic view of a sensing device for a capacitive touch panel according to one embodiment of the invention. As shown in FIG. 3, the capacitive touch panel is rectangular, and has a transparent substrate and a sensing layer on the transparent substrate. The sensing layer is transparent and electrically conductive. The capacitive touch panel has a first X side, a second X side, a first Y side and a second Y side. The sensing device 20 of the invention includes a sensing source 21, a capacitive touch panel 22, at least one X side switch circuit 23, at least one Y side switch circuit 24 and a control circuit 27.

The sensing source 21 includes a first sensing signal source and a second sensing signal source. The first sensing signal source and the second sensing signal source respectively generate at least one first sensing signal and at least one second sensing signal. The X side switch circuits 23 are respectively connected the first X side and the second X side. The Y side switch circuits 24 are respectively connected to the first Y side and the second Y side. The control circuit 27 receives the first sensing signal and the second sensing signal, and decides to connect to either the X side switch circuit 23 or the Y side switch circuit 24 according to the first sensing signal or the second sensing signal. Meanwhile, the control circuit 27 receives at least one X side current signal generated by the X side switch circuit 23 and at least one Y side current signal generated by the Y side switch circuit 24. Then, some proper calculations are performed to determine the X/Y coordinate of a touch point. In a preferred embodiment, the X side switch circuit 23 and the Y side switch circuit 24 can be a short circuit. Alternatively, the first sensing signal source is the same as the second sensing signal source, and the first sensing signal is the same as the second sensing signal.

The control circuit 27 further includes at least one current measurement circuit 270 and a control unit 272. The current measurement circuit 270 receives the X side current signal or the Y side current signal. The control unit 270 further includes at least one analogue/digital conversion circuit 2720 and a location determining unit 2722. The analogue/digital conversion circuit 2720 converts the X side analogue signal generated by the X side current signal into at least one X side digital signal, or converts at least one Y side analogue signal generated by the Y side current signal into at least one Y side digital signal. The location determining unit 2722 carries out proper calculations on the X side digital signal and the Y side digital signal respectively to obtain the X/Y coordinate.

Figure 4:
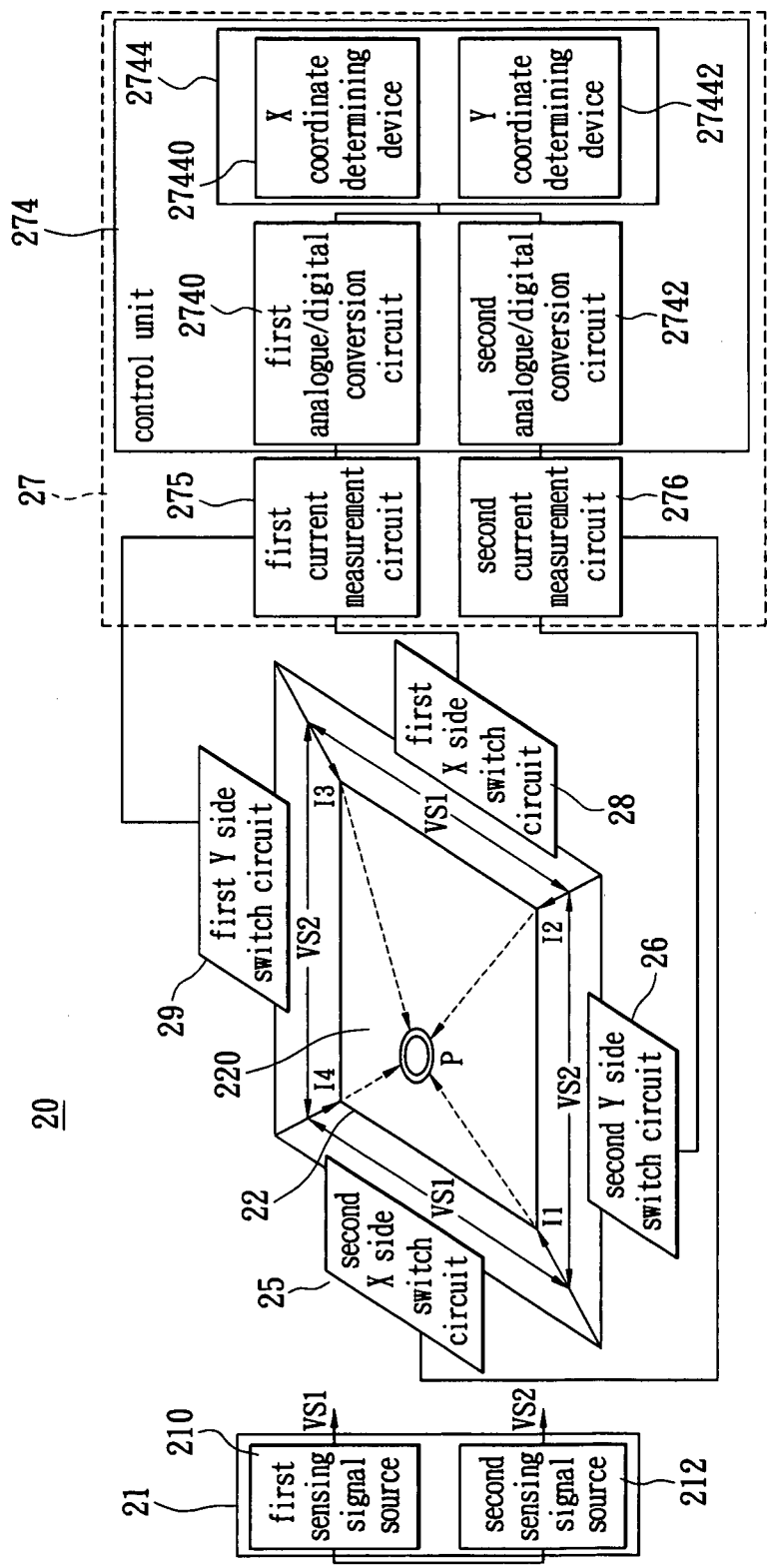
FIG. 4 is a schematic view of a sensing device for a capacitive touch panel according to a first embodiment of the invention.

FIG. 4 is a schematic view of a sensing device for a capacitive touch panel according to a first embodiment of the invention. As shown in FIG. 4, the capacitive touch panel 22 is rectangular, and has a transparent substrate and a sensing layer on the transparent substrate. The sensing layer is transparent and electrically conductive. The capacitive touch panel has a first X side, a second X side, a first Y side and a second Y side. On the sensing layer of the capacitive touch panel 22 has a work area 220, and a touch point P within the work area 220. The sensing device 20 of the invention includes a sensing source 21, a first X side switch circuit 28, a second X side switch circuit 25, a first Y side switch circuit 29, a second Y side switch circuit 26 and a control circuit 27.

The sensing source 21 includes a first sensing signal source 210 and a second sensing signal source 212. The first sensing signal source 210 generates a first sensing signal VS1, a second sensing signal source 212 generates a second sensing signal VS2. When a specific location of the capacitive touch panel 22 is pressed down by an user, four corners of the capacitive touch panel 22 respectively receive the first sensing signal VS1 and the second sensing signal VS2 to measure the location of the touch point P. In FIG. 4, in practice, the first sensing signal VS1 has I2 and I3 flowing over the first X side, and I1 and I4 flowing over the second X side. The second sensing signal VS2 has I3 and I4 flowing over the first Y side, and I1 and I2 flowing over the second Y side.

The first X side switch circuit 28 is electrically connected to the first X side. The second X side switch circuit 25 is electrically connected to the second X side. The first Y side switch circuit 29 is electrically connected to the first Y side. The second Y side switch circuit 26 is electrically connected to the second Y side.

The control circuit 27 includes a first current measurement circuit 275, a second current measurement circuit 276 and a control unit 274. The control unit 274 further includes a first analogue/digital conversion circuit 2740, a second analogue/digital conversion circuit 2742 and a location determining unit 2744. The location determining unit 2744 further includes an X coordinate determining device 27440 and a Y coordinate determining device 27442.

The first current measurement circuit 275 receives either a first X side current signal generated by the first X side switch circuit 28 or a first Y side current signal generated by the first Y side switch circuit 29. The second current measurement circuit 276 receives either a second X side current signal generated by the second X side switch circuit 25 or a second Y side current signal generated by the second Y side switch circuit 26. The first analogue/digital conversion circuit 2740 either converts a first X side analogue signal generated by the first X side current signal into a first X side digital signal, or converts a first Y side analogue signal generated by the firs Y side current signal into a first Y side digital signal. The second analogue/digital conversion circuit 2742 either converts a second X side analogue signal generated by the second X side current signal generated by the second X side current signal into a second X side digital signal or converts a second Y side analogue signal generated by the second Y side current signal into a second Y side digital signal.

The location determining unit 2744 is electrically connected to the first analogue/digital conversion circuit 2740 and the second analogue/digital conversion circuit 2742. The X coordinate determining device 27440 decides to connect to the first X side switch circuit 28 and the second X side switch circuit 25 according to the received first sensing signal. Meanwhile, the X coordinate determining device 27440 receives the first X side digital signal and the second X side digital signal. After proper calculations respectively on the first X side digital signal and the second X side digital signal, the X coordinate of the touch point P is defined. The Y coordinate determining device 27442 decides to connect to the first Y side switch circuit 29 and the second Y side switch circuit 26 according to the received second sensing signal. Meanwhile, the Y coordinate determining device 27442 receives the first Y side digital signal and the second Y side digital signal. After proper calculations respectively on the first Y side digital signal and the second Y side digital signal, the Y coordinate of the touch point P is defined.

The X coordinate and the Y coordinate of the touch point P are respectively obtained by the following formula:

$$X=((I2+I3)-(I1+I4))/I1+I2+I3+I4 \quad (3), \text{ and}$$

$$Y=((I3+I4)-(I1+I2))/I1+I2+I3+I4 \quad (4).$$

In the above formula, (I2+I3) is obtained after the first X side switch circuit 28 is connected. (I1+I4) is obtained after the second X side switch circuit 25 is connected. (I3+I4) is obtained after the first Y side switch circuit 29 is connected. (I1+I2) is obtained after the second Y side switch circuit 26 is connected.

The difference between the first embodiment and prior art is that the first X side switch circuit 28, the second X side switch circuit 25, the first Y side switch circuit 29 and the second Y side switch circuit 26 are used to reduce the number of same circuit used in the prior art, and the conventionally used filter circuits and integration circuits are omitted. The first X side analogue signal of the first current measurement circuit 275 and the second X side analogue signal of the second current measurement circuit 276 are respectively input to the first analogue/digital conversion circuit 2740 and the second analogue/digital conversion circuit 2742. The X side digital signal, the second X side digital signal, the first Y side digital signal and the second Y side digital signal re input to the location determining device 2744 for calculation. Thereby, any noise generated by the circuit or externally can be reduced.

Figure 5:
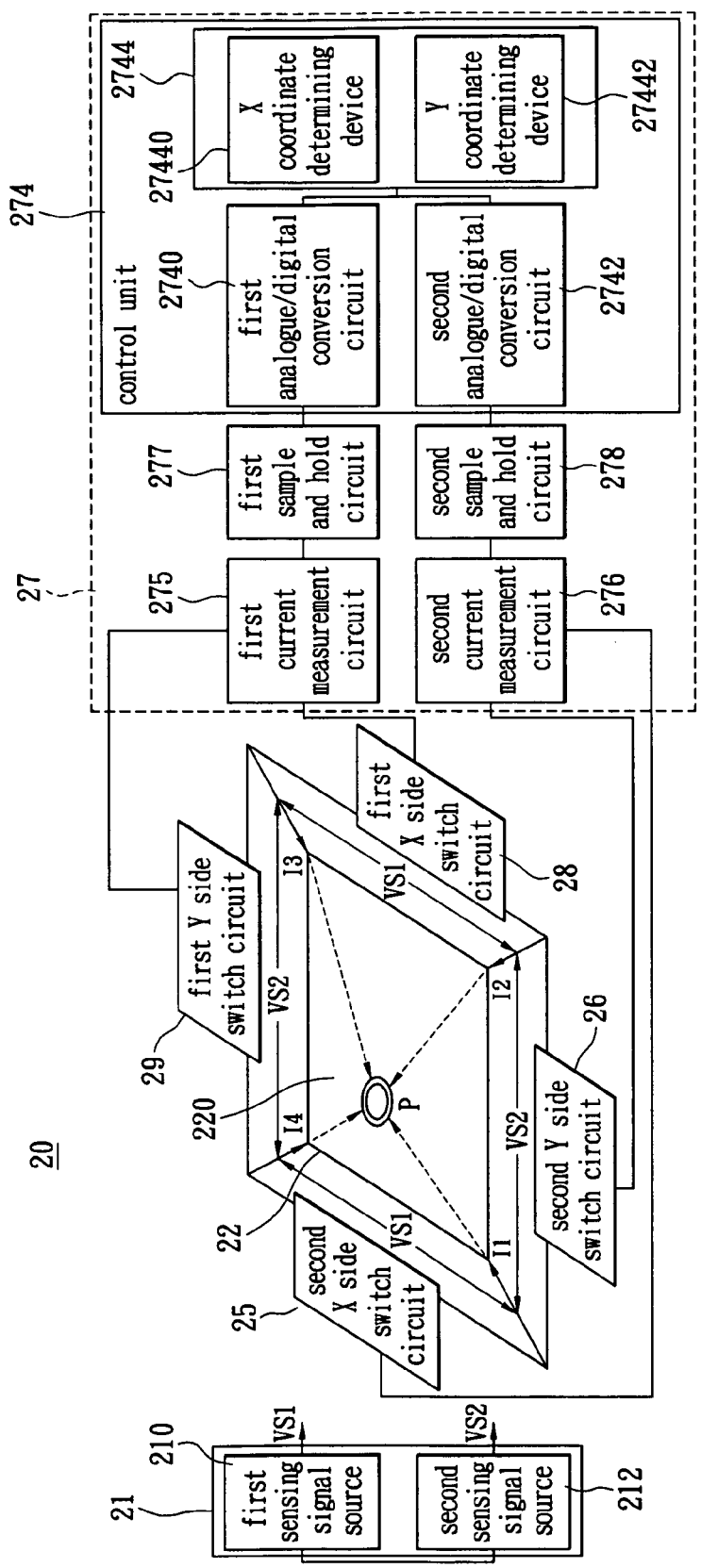
FIG. 5 is a schematic view of a sensing device for a capacitive touch panel according to a second embodiment of the invention.

FIG. 5 is a schematic view of a sensing device for a capacitive touch panel according to a second embodiment of the invention. The second embodiment is the same as the first embodiment, except that a first sample and hold circuit 277 and a second sample and hold circuit 278 are added. The first sample and hold circuit 277 is mounted between the first current measurement circuit 275 and the first analogue/digital conversion circuit 2740, and receives the first X side current signal or the first Y side current signal to proceed the signal sampling, thereby reducing noise generated by the first X side switch circuit 28 or the first Y side switch circuit 29. The second sample and hold circuit 278 is mounted between the second current measurement circuit 276 and the second analogue/digital conversion circuit 2742, and receives the second X side current signal or the second Y side current signal to proceed the signal sampling, thereby reducing any noise generated by the second X side switch circuit 25 or the second Y side switch circuit 26.

Figure 6:
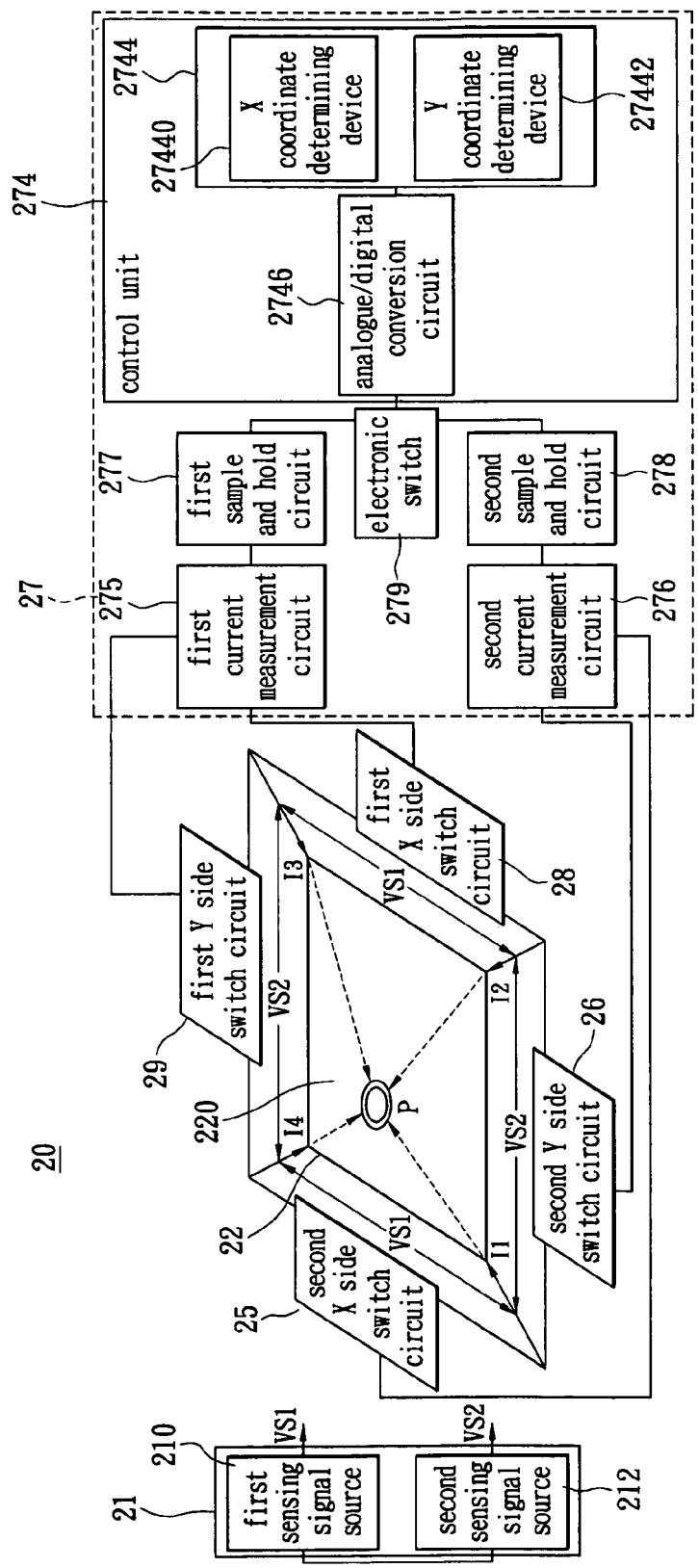
FIG. 6 is a schematic view of a sensing device for a capacitive touch panel according to a third embodiment of the invention.

FIG. 6 is a schematic view of a sensing device for a capacitive touch panel according to a third embodiment of the invention. The third embodiment of the invention is the same as the second embodiment, except that the control unit 274 has only one analogue/digital conversion circuit 2746, and electronic switches 279 is added among the sample and hold circuit 277, the second sample and hold circuit 278 and the analogue/digital conversion circuit 2746. One of the first sample and hold circuit 277 and the second sample and hold circuit 278 is selected to operate according to if the first sensing signal or the second sensing signal is received, so that the first X side current signal and the first Y side current signal or the second X side current signal and the second Y side current signal are obtained. The electronic switch 279 can be any types of electronic switches.

The analogue/digital conversion circuit 2746 receives the first X side analogue signal generated by the first X side current signal, the first Y side analogue signal generated by the first Y side current signal, the second X side analogue signal generated by the second X side current signal and the second Y side analogue signal generated by the second Y side current signal, and respectively converts into a first X side digital signal, a second X side digital signal, a first Y side digital signal and a second Y side digital signal. Meanwhile, the first X side digital signal, the second X side digital signal, the first Y side digital signal and the second Y side digital signal are input into the location determining device 2744 for calculation, thereby, any noise generated by circuits or externally can be reduced.

Figure 7:
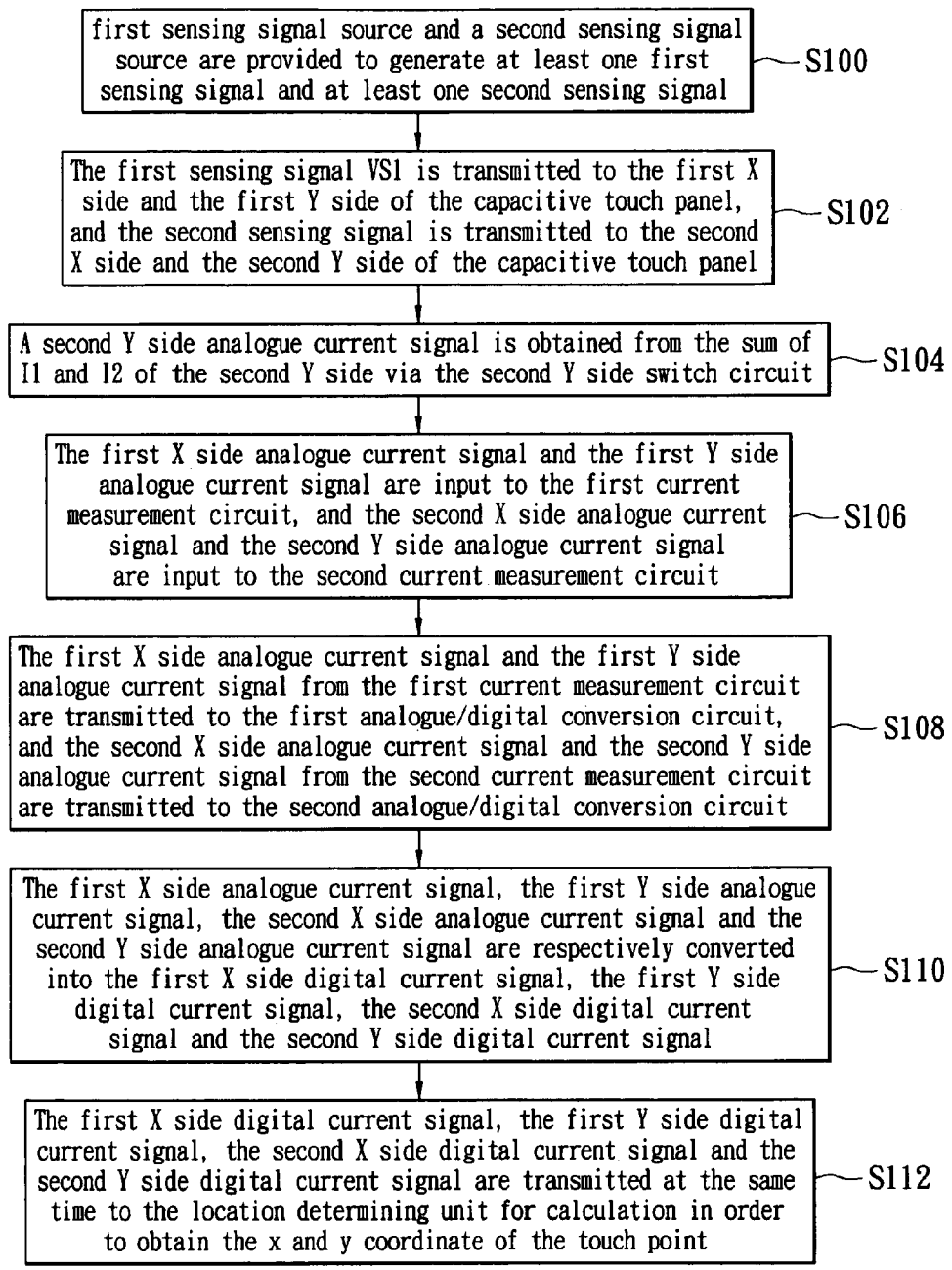
FIG. 7 is a flow chart of a method of reducing noise for a capacitive touch panel according to one embodiment of the invention.

FIG. 7 is a flow chart of a method of reducing noise for a capacitive touch panel according to one embodiment of the invention. A first sensing signal source 210 and a second sensing signal source 212 are provided to generate at least one first sensing signal VS1 and at least one second sensing signal VS2 (S100). The first sensing signal VS1 is transmitted to the first X side and the first Y side of the capacitive touch panel 22, and the second sensing signal VS2 is transmitted to the second X side and the second Y side of the capacitive touch panel (S102). A first X side analogue signal is obtained from the sum of I2 and I3 of the first X side via the first X side switch circuit 28. A first Y side analogue signal is obtained from the sum of I3 and I4 of the first Y side via the first Y side switch circuit 29. A second X side analogue signal is obtained from the sum of I1 and I4 of the second X side via the second X side switch circuit 25. A second Y side analogue signal is obtained from the sum of I1 and I2 of the second Y side via the second Y side switch circuit 26 (S104). The first X side analogue signal and the first Y side analogue signal are input to the first current measurement circuit 275, and the second X side analogue signal and the second Y side analogue signal are input to the second measurement circuit 276 (S106). The first X side analogue signal and the first Y side analogue signal from the first current measurement circuit 275 are transmitted to the first analogue/digital conversion circuit 2740, and the second X side analogue signal and the second Y side analogue signal from the second current measurement circuit 276 are transmitted to the second analogue/digital conversion circuit 2742 (S108).

The first X side analogue signal, the first Y side analogue signal, the second X side analogue signal and the second Y side analogue signal are respectively converted into the first X side digital signal, the first Y side digital signal, the second X side digital signal and the second Y side digital signal (S110). Finally, the first X side digital signal, the first Y side digital signal, the second X side digital signal and the second Y side digital signal are transmitted at the same time to the location determining unit 2744 for calculation in order to obtain the x and y coordinates of the touch point P (S112).

In the prior art, the analog signal of the different corner of the touch panel has different errors in time domain because the errors may change depending on the estimated current time. So, the present invention provides a sensing method and device of a capacitive touch panel to ensure all current signals received simultaneously.

The sensing device of capacitive touch panel of fourth embodiment of the invention comprises a sensing signal source, a plurality of connection circuits, a plurality of digital synchronization circuits and a location determining unit.

The capacitive touch panel connects with a plurality of contacts and the type of capacitive touch panel may be a rectangle, a circular or a polygon. In the present embodiment, the capacitive touch panel is a rectangle and each corner connects with the contacts. In the other embodiment, the capacitive touch panel may be a rectangle and each side connects with the contacts such as FIG. 4 to FIG. 6. In addition, each side of the capacitive touch panel may connect to a plurality of contacts.

Each connection circuit connects with at least one contact to generate an analogue signal respectively. The connection circuit may be a circuit or simply a conducting wire. For example, the connection circuit can be a current detection circuit, a filtering circuit, or integration circuit. Furthermore, the contacts of the same connection circuit may use the conducting wire connects with the same side or two corners of the same side. In the best mode embodiment, the conducting wire may be a short circuit on the contacts. In the other embodiment, the connection circuit connects with a side or a corner through the contact. The present invention comprises a switch or a multiplexer. The switch sets up between the connection circuit and the contacts for selecting a contact connects with the connection circuit.

The digital synchronization circuits receive a plurality of analogue signals for generating a digital signal simultaneously. Each digital synchronization circuit connects with a connection circuit respectively. The digital synchronization circuit and the connection circuits use the switch or the multiplexer for selectively connect with the connection circuit of digital synchronization circuit. The digital synchronization circuit receives a group of analogue signals in a time period and receives other group of analogue signals in a next time period simultaneously. All of the digital synchronization circuits are controlled by a clock signal to ensure that the analogue signals are received simultaneously.

In the best mode embodiment, each whole analogue signal receives one part of each the digital synchronization circuit respectively. In other words, a whole analogue signal divides a plurality of parts in the time domain and each part received by a digital synchronization circuit respectively. Each whole analogue signal has the same ratio noise. The digital synchronization circuit receives noise when analogues signal converts to digital signal. In other words, A current value response to the analogue signal is generated from response to the digital signal of the analogue signal summary. In the same way, the analogue signal of the contact also receives partially for each the connection circuit. In other words, the analogue signal of the contact cuts off a plurality of parts and each the parts is received by a connection circuit.

The location determining unit obtains a current value of each contact in before touch of the capacitive touch panel via the contact, the connection circuit and the digital synchronization circuit. The current value of each the contact is changed when the capacitive touch panel is touch. Comparing the current of before touch with present touch of the capacitive touch panel, and the location determining unit obtains a current difference of each contact. The location determining unit calculates a coordinate according to the above manner. The current of both opposing sides is detected in a first time period, and the current of other both opposing sides are detected in a second time period. A first one dimensional coordinate and a second one dimensional coordinate of a two dimensional coordinate are calculated through above manner. The first one dimensional coordinate and the second one dimensional coordinates are X coordinates and Y coordinates respectively, and the X coordinates and the Y coordinates are obtained by following formula:

$$X = (I\Delta X2 - I\Delta X1)/(I\Delta X1 + I\Delta X2) \quad (5); \text{ and}$$

$$Y = (I\Delta Y2 - I\Delta Y1)/(I\Delta Y1 + I\Delta Y2) \quad (6)$$

The location determining unit obtains a difference $I\Delta X1$ and $I\Delta X2$ of $IX1$ and $IX2$ current value of the two contacts between the first time period and the third time period according to the capacitive touch panel receives the analogue signal on the first time period of before touch and on the third time period of the present touch simultaneously. The location determining unit obtains a difference $I\Delta Y1$ and $I\Delta Y2$ of $IY1$ and $IY2$ current value of the two contacts between the second time period and the fourth time period according to the capacitive touch panel receives the analogue signal on the second time period of before touch and on the fourth time period of the present touch simultaneously. The first time period and the second time period are continuous two time period in time domain and the third time period and the fourth time period are other continuous two time period. In other words, the analogue signal converts into $IX1$, $IX2$, $IY1$ and $IY2$ current value in before touch and present touch of the capacitive touch panel. The location determining unit calculates the first one dimensional coordinate X of two dimensional coordinate according to the current difference $I\Delta X1$ and $I\Delta X2$ of the $IX1$ and $IX2$, and calculates the second one dimensional coordinate Y of two dimensional coordinate according to the current difference $I\Delta Y1$ and $I\Delta Y2$ of $IY1$ and $IY2$. The current of each side received from a contact of the side. The other best mode embodiment, the current of each side received from at least two contact of the side, for example, the contacts of the two corners.

The sensing signal source provides a sensing signal to contact and the connection circuit receives current from the contact. In a best mode embodiment, the sensing signal source provides the sensing signal to a pair of opposing sides in the first time period, and provides the sensing signal to other pair of opposing sides in the second time period. The current of contact is received according to the sensing signal selectively. For example, at least one switch sets up between each contact and the sensing signal source. The contact connects with the sensing signal source through an independent switch respectively, or a plurality of contacts connect with the sensing signal source through the same switch. Therefore, the sensing signal source provides the sensing signal through the switch crisscross.

In the fifth embodiment of the present invention, the number of the contacts, the connection circuits and the digital synchronization circuits is four, respectively. Each connection circuit connects with a contact and each the digital synchronization circuit receives the analogue signal from the connection circuit respectively.

In the sixth embodiment of the present invention, the number of contacts, the connection circuit and the digital synchronization circuit is four, four (two pairs) and two. Each connection circuit connects with at least one contact respectively and two digital synchronization circuits receive the analogue signal from a pair of the two pairs connection circuit crisscross simultaneously. For example, the contacts comprise a first contact, a second contact, a third contact and a fourth contact. The connection circuits comprise a first connection circuit connects the first contact with the second contact, a second connection circuit connects the third contact with the fourth contact, a third connection circuit connects the first contact with the fourth contact and a fourth connection circuit connects the second contact with the third contact, the first connection circuit and the second connection circuit are one of two pair connection circuit, and the third connection circuit and the fourth connection circuit are other of two pair connection circuit. For example, the contacts comprise a first contact, a second contact, a third contact and a fourth contact, the connection circuits comprise a first connection circuit connects with the first contact, a second connection circuit connects with the second contact, a third connection circuit connects with the third contact, and a fourth connection circuit connects with the fourth contact, the first connection circuit and the third connection circuit is a first pair connection circuit and the second connection circuit and the fourth connection circuit is a second pair connection circuit.

In the seventh embodiment of the present invention, the number of the contacts, the connection circuits and the digital synchronization circuits is four, two and two respectively, each connection circuit connect to at least one of contacts respectively, and each digital synchronization circuit receives the analogue signal from one of the connection circuit of two connection circuit simultaneously. For example, the contacts comprise a first contact, a second contact, a third contact and a fourth contact, the connection circuits comprise a first connection circuit and a second connection circuit, the first connection circuit and the second connection circuit connects with two contacts respectively, the second connection circuit connect the third contact with the fourth contact when the first connection circuit connect the first contact with the second contact, the second connection circuit connect the second contact with the third contact when the first connection circuit connect the first contact with the fourth contact.

In additional, the between of contact and the capacitive touch panel or the contact and the connection circuit comprise at least one passive element, such as a resistor or an electrostatic discharge circuit.

In additional, the sensing signal may be an alternating current voltage and comprises a carrier waveform. The carrier waveform may be a sine wave or a square wave. In a whole cycle of alternating current, the carrier wave comprises a positive-half cycle and a negative-half cycle response to the alternating current. The analogue signal of the contact formed on the positive-half cycle and the negative-half cycle. The summary of current value is generated by subtract negative-half cycle from the positive-half cycle as a result of the current direction of the positive-half cycle carrier wave and the positive-half cycle carrier wave are opposite to each other.

In the prior art, the carrier wave may comprise many kinds of noise. Thus, the current signal of positive-half cycle and the negative-half cycle do not have a symmetrical distribution.

In the eighth embodiment of the present invention, a sensing method of a capacitive touch panel comprising: providing a sensing signal to a plurality of contacts of the capacitive touch panel; selectively connecting a plurality of connection circuits with at least one part of the contacts; selectively connecting a plurality of digital synchronization circuits with at least one part of the contacts; separately generating an analog signal according to the contact of each connection circuit; separately generating a digital signal according to each digital synchronization circuit received the analogue signal from one of connection circuit simultaneously; and calculating a coordinate according to a plurality of digital signals.

Figure 8A:
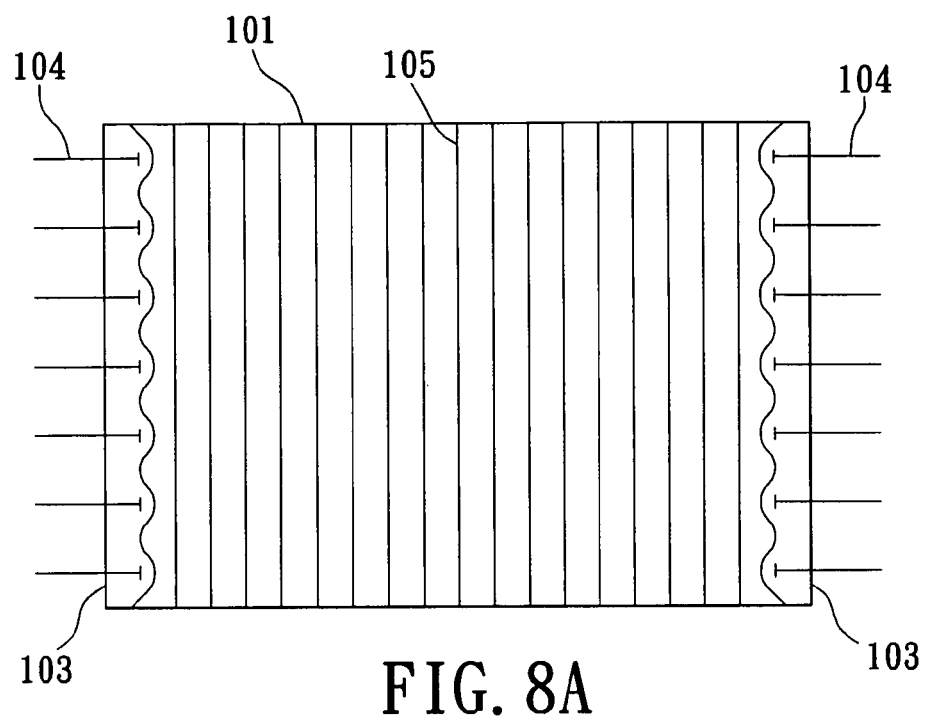
FIGS. 8A and 8B is a schematic view of two layer capacitive touch panel of the invention.
Figure 8B:
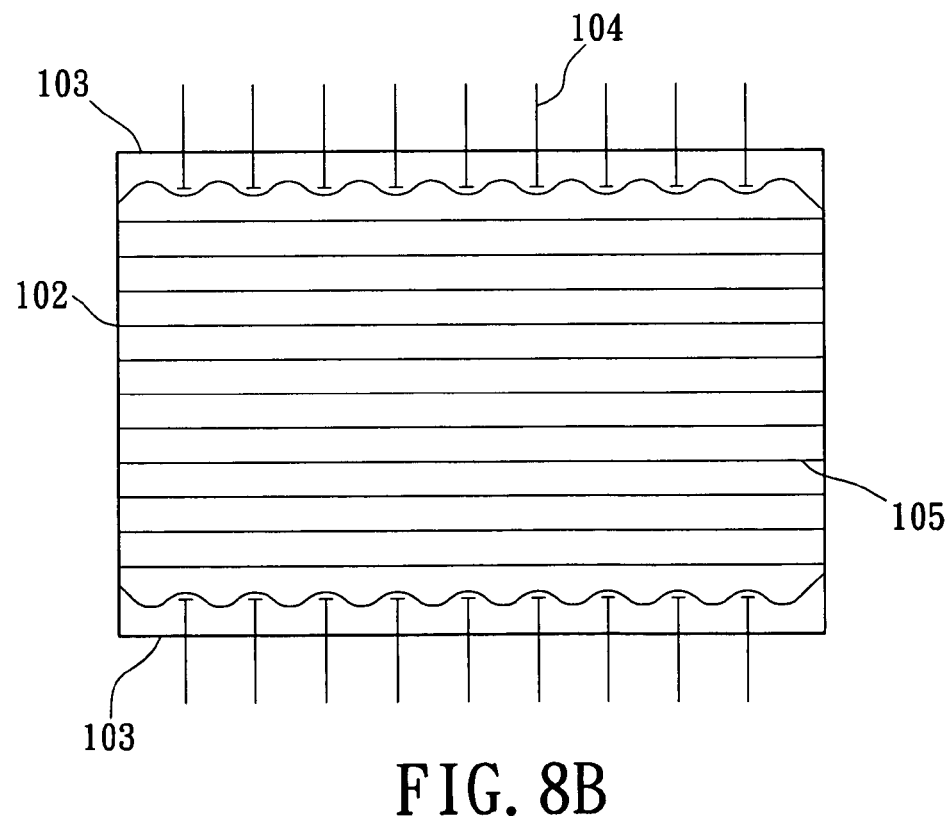

In the ninth embodiment of the present invention shown as FIG. 8, a two-layer capacitive touch panel comprises an upper layer touch panel 101 and a bottom layer touch panel 102. The upper layer touch panel 101 and the bottom layer touch panel 102 have two pairs of opposing sides 103, respectively. Each side 103 connects with a plurality of contacts 104. In another best mode embodiment, each side 103 connects with above three contacts 104. In the other best embodiment, the contacts 104 of the two opposing sides 103 are connected one-by-one correspondingly. The two opposing sides form a parallel electric field 105 when the sensing signal source provides a sensing signal to the contact 104 of the a pair of opposing sides 103.

Figure 9:
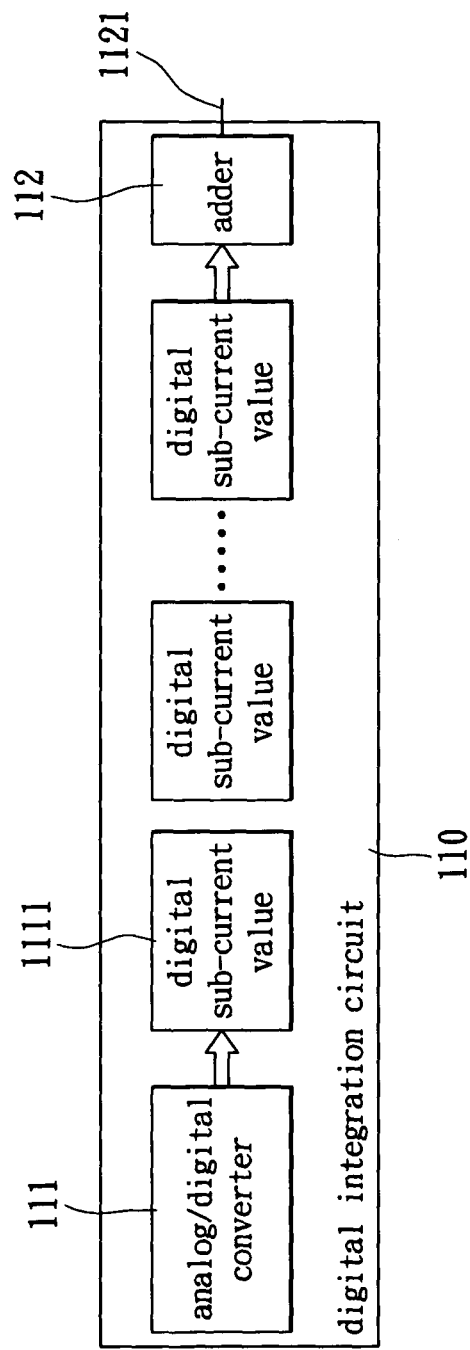
FIG. 9 is a schematic view of a function diagram of the digital integration circuit of the invention.

Referring to FIG. 9, each digital synchronization circuit comprises a digital integration circuit 110. The digital integration circuit 110 comprises an analog/digital converter 111 and an adder 112. The analog/digital converter 111 generates a plurality of digital sub-current values 1111 continuously by repeated sampling of the analogue signal and executing analogue signal to digital signal conversion. The adder 112 summarizes the digital sub-current values 1111. The adder 112 receives and summarizes the digital sub-current values 1111 for generating a summation output 1121 in an added cycle. The cycle of the alternating current voltage is a multiple of the added cycle.

The analogue signal received from an analog/digital converter 111, or the analogue signal cuts off a plurality of parts for received from a plurality of analog/digital converters 111 respectively. The summation output 1121 response to the analogue signal generated by each of adder 112 stores in a storage unit.

The control unit 274 provides two embodiments. First embodiment, the control unit 274 comprises a first analog/digital converter 2740, a second analog/digital converter 2742 and a location determining unit 2744. Second embodiment, the control unit 274 comprises an analog/digital converter 2476 and the location determining unit 2744.

Figure 10:
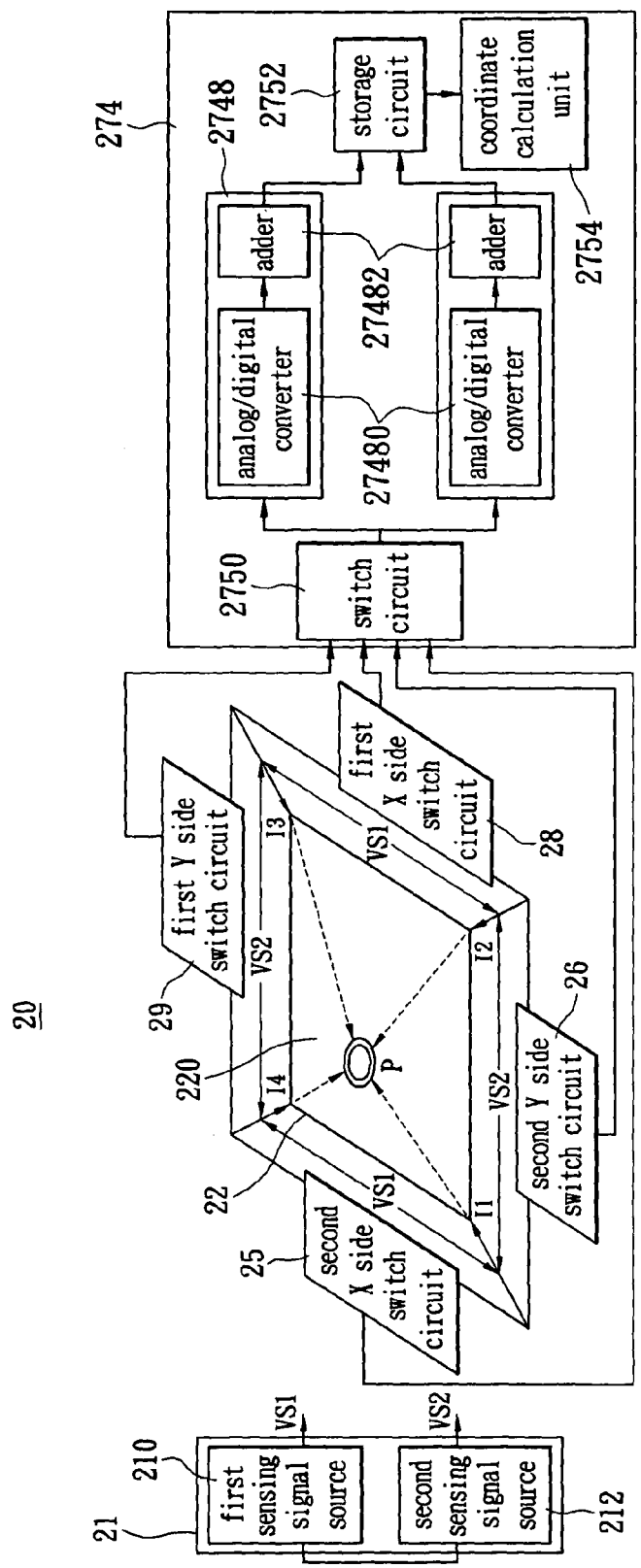
FIG. 10 is a schematic view of a function diagram of the control unit of the invention.

The control unit 274 also provides other embodiment besides above two embodiments, shown as FIG. 10. The control unit 274 comprises a plurality of digital integration units 2748, at least one switch circuit 2750, a storage circuit 2752 and a coordinate calculation unit 2754.

Each digital integration unit 2748 comprises an analog/digital converter 27480 and an adder 27482. The analog/digital converter 27480 converts a plurality of sampled analogue signals into a plurality of digital signals continuously when the analogue signal come from a signal source in an added cycle. The adder 27482 generates an integration value according to the summary of the digital signals in the added cycle. The storage circuit 2752 stores the integration values. The coordinate calculation unit 2754 calculates a coordinate according to the integration value.

The digital integration unit 2748 comprises a first and a second digital integration unit 2748. The switch circuits 2750 receives the analogue signal from a first pair of opposing side and a second pair of opposing side of the capacitive touch panel in a first and a second cycle respectively. The first pair of opposing side crisscrosses with the second pair of opposing sides. The first cycle and the second cycle comprises at least one added cycle respectively. In other words, the first cycle and the second cycle may comprise the added cycle or continuous a plurality of added cycles. The time length of the cycle may be a clock cycle, a ½ clock cycle, a ¼ clock cycle or another fractional clock cycle.

The coordinate calculation unit 2754 calculates a coordinate according to a whole (such as a whole clock cycle) or partially (such as ½ or ¼ clock cycle) analogue signal. Besides, the analogue signal may be received from a single or a plurality of different digital integration units 2748 in cycle duration. For example, the analogue signals of each source signal received by different digital integration unit 2748 in different added cycle at the same cycle duration respectively. The integration values may be stored on the storage circuit 2752. The coordinate calculation unit 2754 generates a summary value of the source signal according to the integration values from the same signal source in the same cycle duration. Then, the coordinate calculation unit 2754 calculates the coordinate according to the summary value. The analogue signal is only received by a digital integration circuit 2748 when a cycle includes an added cycle. The summary value (integration value) of each analogue signal has different digital integration circuit 2748 noise. The summary value of each analogue signal has all of digital integration unit 2748 noise when the analogue signal of each signal source received by all of digital integration unit 2748 respectively.

The digital integration unit 2748 has at least three embodiments. In the first embodiment, the coordinate calculation unit 2754 generates a summary value (may be the current value or parts of current value) according to at least one integration value of the same source signal in a cycle duration. The cycle comprises at least one added cycle and every integration value corresponding an added cycle respectively. The coordinate calculation unit 2754 generates a first and a second summary value from a plurality of signal sources in a first and a second cycle respectively. The coordinate calculation unit 2754 generate a difference from subtract the first summary value from the second summary value of the same signal source. The coordinate calculation unit 2754 calculates the coordinate according to the difference. The difference may be a one dimensional coordinates or a two dimensional coordinate. The difference comprises a first and a second difference when the coordinate is one dimensional coordinate. The one dimensional coordinate calculated by (the first difference−the second difference)/(the first difference+the second difference).

The difference comprises a first, a second, a third and a fourth difference, a first one dimension of the two dimension is calculated from ((the first difference+the second difference)−(the third difference+the fourth difference))/(the first difference+the second difference+the third difference+the fourth difference), a second one dimensional coordinate of the two dimensional coordinates is calculated from ((the first difference+the fourth difference)−(the second difference+the third difference))/(the first difference+the second difference+the third difference+the fourth difference) when the coordinate is a two dimensional coordinate.

In the second embodiment, the digital integration unit 2748 generates a plurality of first, second, third and fourth summary values from a first, second, third and fourth cycle respectively, the coordinate calculation unit 2754 generates a first difference by subtract the first summary value and the third summary value, and a second difference by subtract the second summary value and the fourth summary value from the same signal source, the coordinate calculation unit 2484 calculates a first one dimensional coordinate of a two dimensional coordinate according to the first difference, and a second one dimensional coordinate of the two dimensional coordinate according to the second difference.

In the third embodiment, the digital integration unit 2748 generates a plurality of first, second, third, fourth, fifth and sixth summary values according to a first, second, third, fourth, fifth and sixth cycle respectively, the coordinate calculation unit 2754 generating a first difference and a second difference by subtract the third summary value and the fifth summary value from the first summary value of the same signal source respectively, the coordinate calculation unit generating a third difference and a fourth difference by subtract the fourth summary value and the sixth summary value from the second summary value of the same signal source respectively, the coordinate calculation unit calculates a first one dimensional coordinate of a first and a second two dimensional coordinate according to the first difference and the second difference respectively, the coordinate calculation unit 2754 calculates a second one dimensional coordinate of the first and the second two dimensional coordinate according to the second difference and the fourth difference.

The first, second, third, fourth, fifth and sixth cycle is a clock cycle respectively. In other embodiment, the first, second, third, fourth, fifth and sixth cycle is a part of clock cycle respectively such as ½ clock cycle or ¼ clock cycle. In other words, the one dimensional coordinate or two dimensions coordinate calculated by parts of clock cycle of the analogue signal.

Besides, the switch circuit 2750 allows the analogue signal of one side to be received by different digital integration circuits, and generates a summary value for storing on the storage circuit 2752. The switch circuit 2750 lets the first and second digital integration circuit to receive the analogue signal of a different side of the opposite side in before half cycle (such as first cycle) of a first clock cycle and after half cycle (such as second cycle) respectively. For example, the opposite side is a first side and a third side. In the first cycle, the switch circuit 2750 lets the first and the second digital integration circuit to receive the third side and the after half analogue signal of the first side.

The switch circuit 2750 is achieved by a plurality of multipliers, the first X side switch circuit, the first Y side switch circuit, the second X side switch circuit and the second Y side switch circuit or consists of multiplier and the first X side switch circuit, the first Y side switch circuit, the second X side switch circuit and the second Y side switch circuit.

The control unit 274 provides another embodiment, the function diagram control unit 274 is the same of FIG. 10.

The each part of same analogue signal received from different digital integration circuit 2748 when the analogue/digital converter 27480 receives the analogue signal come from a part of an analogue signal. The analogue/digital converter 27480 converts a plurality of sampled analogue signals into a plurality of digital signals continuously when the analogue signal come from a part of an analogue signal, each digital integration circuit receives a part of different analogue signal respectively. The adder 27482 generates an integration value of the part of the analogue signal according to the summary of the digital signals. The coordinate calculation unit 2754 obtains a summary value of the analogue signal from every part of the same analogue signal summary respectively and for calculating a coordinate according to the summary values. The coordinate calculation unit 2754 calculates the coordinate according to the summary value.

The digital integration unit 2748 comprises a first and a second digital integration unit 2748. The switch circuits 2750 receives the analogue signal from a first pair of opposing side and a second pair of opposing side of the capacitive touch panel in a first and a second cycle respectively. The first pair of opposing side crisscrosses with the second pair of opposing side. The storage circuit 2752 stores the summary value.

The digital integration unit 2748 has at least three embodiments. In the first embodiment, the coordinate calculation unit 2754 generates a first and a second summary value from a plurality of signal sources in a first and a second cycle respectively. The coordinate calculation unit 2754 generate a difference from subtract the first summary value from the second summary value of the same signal source. The coordinate calculation unit 2754 calculates the coordinate according to the difference. The difference may be a one dimensional coordinates or a two dimensional coordinate. The difference comprises a first and a second difference when the coordinate is one dimensional coordinate. The one dimensional coordinate calculated by (the first difference–the second difference)/(the first difference+the second difference).

The difference comprises a first, a second, a third and a fourth difference, a first one dimension of the two dimension is calculated from ((the first difference+the second difference)–(the third difference+the fourth difference))/(the first difference+the second difference+the third difference+the fourth difference), a second one dimensional coordinate of the two dimensional coordinate is calculated from ((the first difference+the fourth difference)–(the second difference+the third difference))/(the first difference+the second difference+the third difference+the fourth difference) when the coordinate is a two dimensional coordinate.

In the second embodiment, the digital integration unit 2748 generates a plurality of first, second, third and fourth summary values from a first, second, third and fourth cycle respectively, the coordinate calculation unit 2754 generates a first difference by subtract the first summary value and the third summary value, and a second difference by subtract the second summary value and the fourth summary value from the same signal source, the coordinate calculation unit 2484 calculates a first one dimensional coordinate of a two dimensional coordinate according to the first difference, and a second one dimensional coordinate of the two dimensional coordinate according to the second difference.

In the third embodiment, the digital integration unit 2748 generates a plurality of first, second, third, fourth, fifth and sixth summary values according to a first, second, third, fourth, fifth and sixth cycle respectively, the coordinate calculation unit 2754 generating a first difference and a second difference by subtract the third summary value and the fifth summary value from the first summary value of the same signal source respectively, the coordinate calculation unit generating a third difference and a fourth difference by subtract the fourth summary value and the sixth summary value from the second summary value of the same signal source respectively, the coordinate calculation unit calculates a first one dimensional coordinate of a first and a second two dimensional coordinate according to the first difference and the second difference respectively, the coordinate calculation unit 2754 calculates a second one dimensional coordinate of the first and the second two dimensional coordinate according to the second difference and the fourth difference.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims. Furthermore, the X axis and the Y axis recited above can be exchanged and also in the scope of the invention.

What is claimed is:

1. A sensing device for a capacitive touch panel, the capacitive touch panel being rectangular and having a transparent substrate and a sensing layer on the transparent substrate, the sensing layer being transparent and electrically conductive, the capacitive touch panel further having a first X side, a second X side, a first Y side and a second Y side, the sensing device comprising:
   a first X side switch circuit, respectively electrically connected to the first X side;
   a second X side switch circuit, respectively electrically connected to the second X side;
   a first Y side switch circuit, respectively electrically connected to the first Y side;
   a second Y side switch circuit, respectively electrically connected to the second Y side;
   a sensing source, providing a sensing signal to the first X side switch circuit, the second X side switch circuit, the first Y side switch circuit and the second Y side switch circuit; and
   a control circuit, receiving the sensing signal generated by the sensing source, the control circuit further comprising:
      a first current measurement circuit, electrically connected to the first X side switch circuit and the first Y side switch circuit; and
      a second current measurement circuit, electrically connected to the second X side switch circuit and the second Y side switch circuit;
      wherein the first current measurement circuit and the second current measurement circuit respectively receiving either a first X side current signal and a second X side current signal or a second X side current and a first Y side current signal simultaneously, wherein the first X side current signal is generated by the first X side switch circuit, the second X side current signal is generated by the second X side switch circuit, the first Y side current signal is generated by the first Y side switch circuit, and the second Y side current signal is generated by the second Y side switch circuit;
   a control unit, comprising:
      a first analogue/digital conversion circuit, electrically connected to the first current measurement circuit, converting a first X side analogue signal generated by the first X side current signal into a first X side digital signal, or converting a first Y side analogue signal generated by the first Y side current signal into a first Y side digital signal; and a second analogue/digital conversion circuit, electrically connected to the second current measurement circuit, converting a second X side analogue signal generated by the second X side current signal into a second X side digital signal, or converting a second Y side analogue signal generated by the second Y side current signal into a second Y side digital signal; and a location determining unit, electrically connected to the first analogue/digital conversion circuit and the second analogue/digital conversion circuit, and comprising:

a X coordinate determining device, receiving the first X side digital signal and the second X side digital signal, and determining the X coordinate of a touch point after calculations of the first X side digital signal and the second X side digital signal have been carried out; and a Y coordinate determining device, receiving the first Y side digital signal and the second Y side digital signal, and determining the Y coordinate of the touch point after calculations of the first Y side digital signal and the second Y side digital signal have been carried out.

2. The sensing device for a capacitive touch panel of claim 1, wherein the control circuit further comprises:

a first sample and hold circuit, arranged between the first current measurement circuit and the first analogue/digital conversion circuit to receive the first X side current signal or the first Y side current signal for sampling; and a second same and hold circuit, arranged between the second current measurement circuit and the second analogue/digital conversion circuit to receive the second X side current signal or the second Y side current signal for sampling.

3. The sensing device for a capacitive touch panel of claim 1, wherein the sensing source comprises a first sensing signal source and a second sensing signal source for generating a first sensing signal and a second sensing signal respectively, the X coordinate determining device connects the first X side switch circuit and the second X side switch circuit according to the first sensing signal, and the Y coordinate determining device connects the first Y side switch circuit and the second Y side switch circuit according to the second sensing signal.

4. The sensing device for a capacitive touch panel of claim 1, wherein the capacitive touch panel further comprises a rectangular work area and the touch point within the work area.

\* \* \* \* \*